United States Patent
Wang

(10) Patent No.: US 11,902,975 B2
(45) Date of Patent: Feb. 13, 2024

(54) CLOUD BASED PROMPT WIRELESS CONNECTION METHOD

(71) Applicant: ARRIS Enterprises LLC, Suwanee, GA (US)

(72) Inventor: Liang Wang, Shenzhen (CN)

(73) Assignee: ARRIS ENTERPRISES LLC, Horsham, PA (US)

(*) Notice: Subject to any disclaimer, the term of this patent is extended or adjusted under 35 U.S.C. 154(b) by 430 days.

(21) Appl. No.: 17/311,927

(22) PCT Filed: Jul. 30, 2020

(86) PCT No.: PCT/CN2020/105707
§ 371 (c)(1),
(2) Date: Jun. 8, 2021

(87) PCT Pub. No.: WO2022/021185
PCT Pub. Date: Feb. 3, 2022

(65) Prior Publication Data
US 2022/0322322 A1 Oct. 6, 2022

(51) Int. Cl.
*H04W 72/20* (2023.01)
*H04W 76/30* (2018.01)
(Continued)

(52) U.S. Cl.
CPC ........... *H04W 72/20* (2023.01); *H04L 5/0048* (2013.01); *H04W 76/30* (2018.02); *H04W 84/10* (2013.01); *H04W 88/08* (2013.01)

(58) Field of Classification Search
None
See application file for complete search history.

(56) References Cited

U.S. PATENT DOCUMENTS

2015/0282032 A1* 10/2015 Gupta .................. H04W 48/14
370/329
2017/0111244 A1 4/2017 Strater et al.
(Continued)

FOREIGN PATENT DOCUMENTS

CN 1640062 7/2005
CN 105323826 2/2016
(Continued)

OTHER PUBLICATIONS

International Search Report and the Written Opinion of the International Searching Authority dated Apr. 23, 2021 in International (PCT) Application No. PCT/CN2020/105707

*Primary Examiner* — Rebecca E Song
(74) *Attorney, Agent, or Firm* — Wenderoth, Lind & Ponack, L.L.P.

(57) ABSTRACT

A home network controller (HNC) device includes a memory and a processor configured to execute instructions stored on the memory to cause the HNC device to: instruct an APD to communicate with a client device over a first channel; receive a client information signal from the APD, wherein the client information signal relates to the client device and includes client disassociation data and client identification data; instruct the APD to communicate with the client device over a second channel; and transmit a channel information signal to the client device via the external network, wherein the channel information signal includes channel identification data identifying the second channel. The client disassociation data indicates that the client device has disassociated from the APD. The client identification data enables the processor to transmit the channel information signal to the client device via the external network.

8 Claims, 8 Drawing Sheets

(51) Int. Cl.
*H04L 5/00* (2006.01)
*H04W 84/10* (2009.01)
*H04W 88/08* (2009.01)

(56) References Cited

U.S. PATENT DOCUMENTS

| | | | |
|---|---|---|---|
| 2017/0180105 A1* | 6/2017 | Clegg | H04L 5/0055 |
| 2018/0176284 A1* | 6/2018 | Strater | H04B 17/318 |
| 2022/0116858 A1* | 4/2022 | Sugaya | H04W 72/0453 |

FOREIGN PATENT DOCUMENTS

| | | |
|---|---|---|
| CN | 106688271 | 5/2017 |
| CN | 110839288 | 2/2020 |
| CN | 111163497 | 5/2020 |

\* cited by examiner

CLOUD BASED PROMPT WIRELESS CONNECTION METHOD

BACKGROUND

Embodiments of the present disclosure generally relate to re-associating a client device with an access point device within a wireless network.

SUMMARY

Aspects of the present disclosure are drawn to a home network controller (HNC) device for use with an access point device (APD) and a wireless client device over a wireless local area network that is configured to communicate with an external network. The APD is configured to communicate with the external network over a first channel within the wireless local area network and over a second channel within the wireless local area network. The APD is additionally configured to transmit a client information signal via the wireless local area network. The HNC device includes a memory and a processor configured to execute instructions stored on the memory to cause the HNC device to: instruct the APD to communicate with the client device over a first channel; receive a client information signal from the APD, wherein the client information signal relates to the wireless client device and includes client disassociation data and client identification data; instruct the APD to communicate with the client device over the second channel; and transmit a channel information signal to the wireless client device via the external network, wherein the channel information signal includes channel identification data identifying the second channel. The client disassociation data indicates that the wireless client device has disassociated from the APD. The client identification data enables the processor to transmit the channel information signal to the wireless client device via the external network.

In some embodiments the processor is further configured to cause the HNC to transmit the channel information signal as one of the group consisting of an email, a text, and combinations thereof.

In some embodiments, the memory and the processor are disposed within a gateway device.

In some embodiments, the memory and the processor are disposed within a second APD.

Another aspect of the present disclosure is drawn to a method of operating a HNC device for use with an APD and a wireless client device over a wireless local area network that is configured to communicate with an external network. The APD is configured to communicate with the external network over a first channel within the wireless local area network and over a second channel within the wireless local area network. The APD is configured to transmit a client information signal via the wireless local area network. The method includes: instructing, via a processor that is configured to execute instructions stored on a memory, the APD to communicate with the external network over the first channel; receiving, via the processor and from the APD, the client information signal relating to the wireless client device and including client disassociation data and client identification data; instructing, via the processor, the APD to communicate with the external network over the second channel; and transmitting, via the processor, a channel information signal to the wireless client device via the external network, the channel information signal including channel identification data identifying the second channel. The client disassociation data indicates that the wireless client device has disassociated with the APD and the client identification data enables the processor to transmit the channel information signal to the wireless client device via the external network.

In some embodiments the transmitting the channel information signal to the wireless client device includes transmitting the channel information signal as one of the group consisting of an email, a text and combinations thereof.

Another aspect of the present disclosure is drawn to a non-transitory computer-readable media having computer-readable instructions stored thereon. The computer-readable instructions are capable of being read by a HNC device for use with an APD and a wireless client device over a wireless local area network and being configured to communicate with an external network. The APD is configured to communicate with the external network over a first channel within the wireless local area network and over a second channel within the local area network. The APD is additionally configured to transmit a client information signal via the wireless local area network. The computer-readable instructions can instruct the HNC device to perform a method including: instructing, via a processor that is configured to execute instructions stored on a memory, the APD to communicate with the external network over the first channel; receiving, via the processor, a client information signal from the APD, the client information signal relating to the wireless client device and including client disassociation data and client identification data; instructing, via the processor, the APD to communicate with the external network over the second channel; and transmitting, via the processor, a channel information signal to the wireless client device via the external network, the channel information signal including channel identification data identifying the second channel. The client disassociation data indicates that the wireless client device has disassociated from the APD, and the client identification data enables the processor to transmit the channel information signal to the wireless client device via the external network.

In some embodiments the computer-readable instructions are capable of instructing the HNC device to perform the method wherein the transmitting the channel information signal to the wireless client device includes transmitting the channel information signal as one of the group consisting of an email, a text and combinations thereof.

BRIEF SUMMARY OF THE DRAWINGS

The accompanying drawings, which are incorporated in and form a part of the specification, illustrate example embodiments and, together with the description, explain the principles of the present disclosure. In the drawings.

DETAILED DESCRIPTION

A mobile client device may be associated with an APD within a wireless network, for example within a home or business. The mobile client device may leave the home, or business, and thereby disassociate from the APD and therefore leave the wireless network. However, the mobile client device may then return to the home, or business, and rejoin the wireless network. To rejoin the wireless network, the mobile client device will need to re-associate with the APD. Conventionally, the mobile client device will need to scan all the channels of the wireless network to discover the APD in order to re-associate. This will be described in greater detail with reference to FIGS. 1A-C.

Figure 1A:
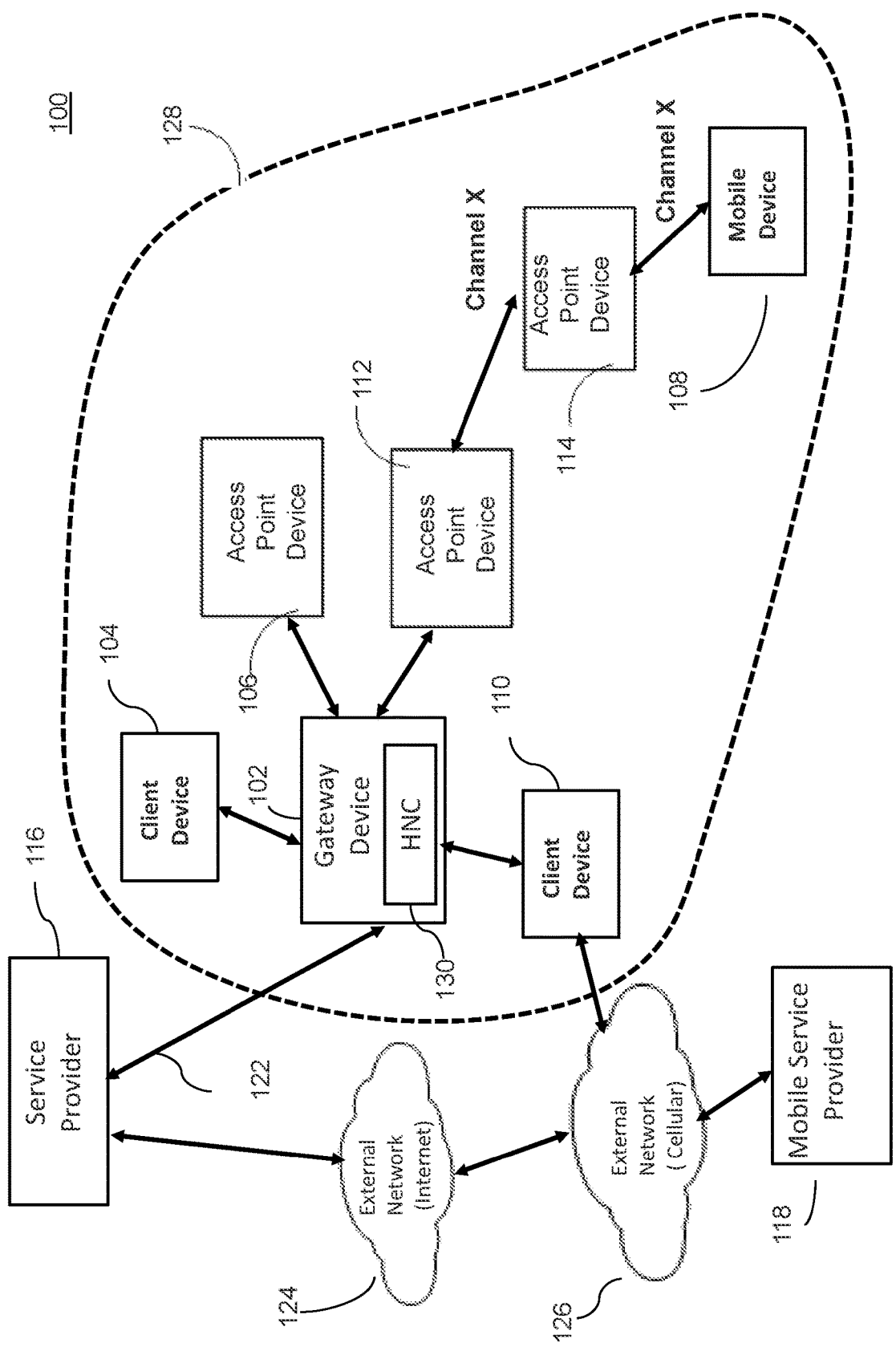
FIG. 1A illustrates a system for wireless communication, at time $t_0$.

FIG. 1A illustrates a system 100 for wireless communication at time $t_0$.

As shown in the figure, system 100 includes: a powered gateway device 102 and; a multitude of client devices, a sample of which are illustrated as a client device 104, and a mobile device 108; a plurality of APDs, a sample of which are illustrated as an APD 106, an APD 112, and an APD 114; a service provider 116; a mobile service provider 118; an external network 124, e.g., the Internet; a cellular network 126; and a wireless network 128.

A gateway device 102, also referred to as a gateway, residential gateway, or RG, is an electronic device that is to be located to establish a local area network (LAN) at a consumer premises. The consumer premises can include a residential dwelling, office, or any other business space of a user. The terms home, office, and premises may be used synonymously herein.

Gateway device 102 may be any device or system that is configured to allow data to communicate over discrete network to another, which in this example is to external network 124, e.g., the Internet, by way of service provider 116. Gateway device 102 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, and random early detection (RED), TCP/UDP flow control).

Within gateway device 102 resides a home network controller (HNC) 130 that manages APDs within wireless network 128 for example by bandwidth usage policing, dynamic load balancing, and routing. It should be noted that an HNC may reside in any access point of wireless network 128, including any of gateway device 102, and APDs 106, 112 and 114. HNC 130 is shown here in gateway device 130 as an example and merely for purposes of discussion.

Gateway device 102 establishes, or is part of, WLAN 104, using Wi-Fi for example, such that client devices 104 and 110 and mobile device 108, and APDs 106, 112 and 114 sync and communicate wirelessly with gateway device 102. In particular, gateway device 102 can communicate wirelessly directly with client devices 104 and 110 and APDs 106 and 112. Further, gateway device 102 can communicate wirelessly with APD 114 via APD 112 and is able to communicate wirelessly with mobile device 108 via APD 112 and APD 114. The term Wi-Fi as used herein may be considered to refer to any of Wi-Fi 4, 5, 6, 6E, or any variation thereof.

Further, it should be noted that gateway device is able to communicate with service provider 116 via physical media/wiring 122, which may optionally be a wireless communication system, such as 4G, or 5G, and further is able to connect to external network 124, e.g., the Internet, via service provider 116.

Service provider 116 includes head-end equipment such as server computers (e.g., automatic configuration server ACS, cable modem termination system CMTS) that enable a service provider, such as a cable television provider, a satellite television provider, an internet service provider, or multiple-systems operator (MSO), to provide content (such as audio/video content and/or internet service) either through physical media/wiring 122, such as a coaxial network, an optical fiber network, and/or DSL, or wireless network, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a public data telephone network (PSDN), a global Telex network, or a 2G, 3G, 4G or 5G, for example.

Service provider 116 includes head-end equipment such as server computers (e.g., automatic configuration server ACS) that enable a service provider, such as a cable television provider, a satellite television provider, an internet service provider, or multiple-systems operator (MSO), to provide content (such as audio/video content and/or internet service) either through physical media/wiring 122, such as a coaxial network, an optical fiber network, and/or DSL, or wireless network, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a public switched telephone network (PTSA), a global Telex network, or a 2G, 3G, 4G or 5G network accessible via physical media/wiring 122. Such networks can also generally contextually be referred to herein as the internet or the cloud.

Gateway device 102 serves as a gateway or access point to external network 124, e.g., the Internet (or otherwise as mentioned above), for one or more electronic devices, referred to generally herein as client devices 104 and 110 and mobile device 108 that wirelessly communicate with gateway device 102 via, e.g., Wi-Fi. Client devices 104 and 110 and mobile device 108 can be desk top computers (except mobile device 108), laptop computers, electronic tablet devices, smart phones, appliances, or any other so called internet of things equipped devices that are equipped to communicate information via WLAN 128.

APD 112 and APD 114 can be paired with gateway device 102 to communicate wirelessly with gateway device 102 and extend the coverage area of WLAN 128. Any of the client devices can be in communication with gateway device 102 or either of APDs 106, 112 and 114. Client device 110 can also have a wireless data communication via wireless network 126 e.g., 3G, LTE, 4G, 5G, etc., via a mobile data provider 118.

Gateway device 102 has the capability of wirelessly communicating with plural electronic user devices over respective communication avenues. In order to extend the area in which WLAN 128 is effective, beyond the radio reach of gateway device 102, one of APD 106, 112, and 114 can be added. The establishment of the operative communications between an APD and gateway device 102 (or between APD 114 and an already established APD 112) is referred to as onboarding the extender. APDs 106, 112, and 114 can communicate wirelessly with gateway device 102. However, rather than using one of the communication avenues that are allocated for communication with user devices, a dedicated avenue of communication may be established, at least at sometimes, between the extender and gateway device 102. This dedicated avenue is referred to as a backhaul.

Within WLAN 128, electronic devices are often referred to as being stations in WLAN 128. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 128, gateway device 102, APD 106, 112 and APD 114 are access points for WLAN 128.

Insofar as gateway device 102 provides connection to service provider 116, such as an MSO, gateway device 102 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 1 as gateway device 102 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

As shown in FIG. 1A, at time $t_0$, mobile device 108 is associated with APD 114 so that it may access external network 124 by way of APD 114, by way of APD 112, by way of gateway device 102, and by way of service provider 116.

Within wireless network 128, the APDs may communicate with gateway device 102 over a plurality of different respective channels to provide distinct communication channels for different client devices. For example, in FIG. 1A, mobile device 108 is communicating with APD 114 over a channel X.

HNC 130 may instruct an APD to communicate over a different channel in order to optimize network resources. For example if an APD is currently communicating on a channel that has a relatively high traffic congestion, HNC 130 may instruct that APD to begin communicating on an unused channel having a traffic congestion. If a client device is associated with an APD over a first channel, say channel X, that client device might at some point in the future disassociate from the APD. If the client device would like to associate again with the client device later, then the client device will likely search for the APD on channel X. However, if HNC 130 instructs the APD to stop communicating on channel X and start communicating on another channel, say channel Y, while the client device is not associated with the APD, then when the client device eventually attempts to associate with the APD, the client device will not discover the APD on channel X. This will be described in greater detail with reference to FIGS. 1B-C.

Figure 1B:
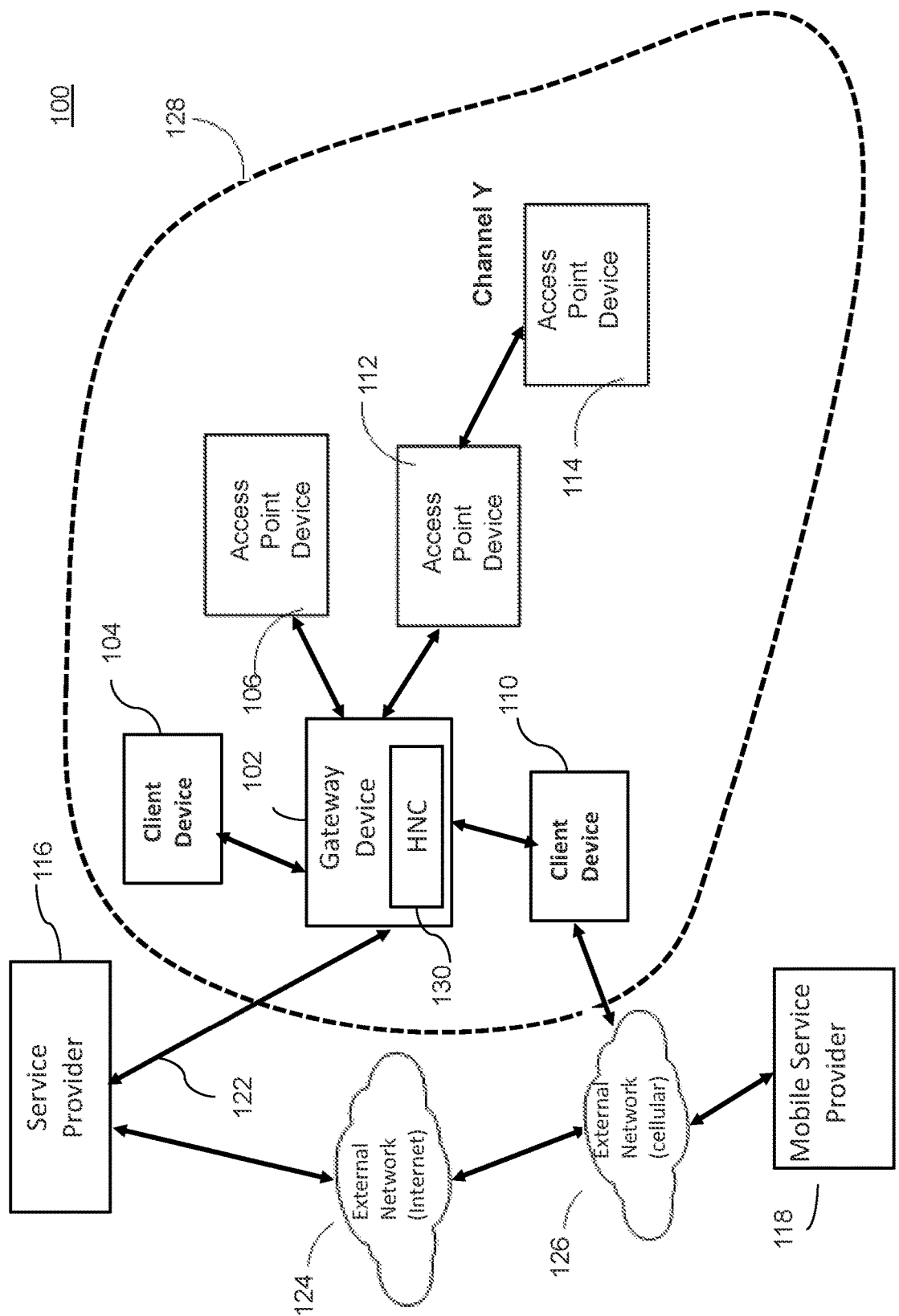
FIG. 1B illustrates the system of FIG. 1A at time $t_1$.

FIG. 1B illustrates system 100 at time $t_1$.

As shown in the figure, sometime after $t_1$ discussed above with reference to FIG. 1A, mobile device 108 has left wireless network 128 thereby disassociating with APD 114. Further, for purposes of discussion, suppose that at time $t_1$, HNC 130 has instructed APD 114 to stop communicating on channel X and to start communicating on channel Y. This instruction to change channels is common place in a wireless network. However, an issue arises when mobile device 108 returns and expects to again associate with APD 114 over channel X. This will be described with reference to FIG. 1C.

Figure 1C:
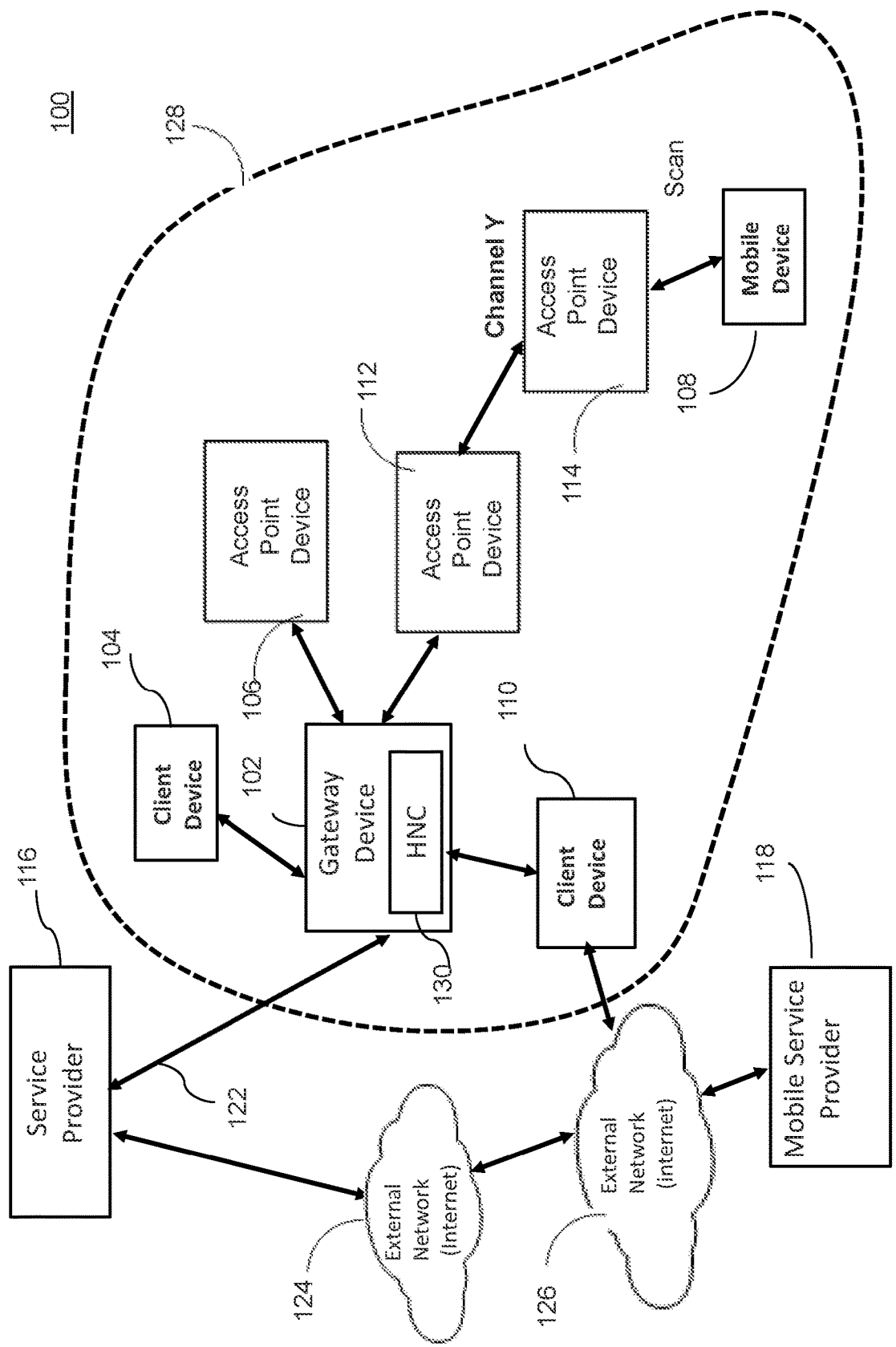
FIG. 1C illustrates the system of FIG. 1A at time $t_2$.

FIG. 1C illustrates system 100 at time $t_2$.

As shown in the figure, mobile device 108 has returned to the physical vicinity of wireless network 128 with the intent to connect to wireless network 128 by way of associated onto APD 114. As mobile device 108 was previously associated with APD 114 over channel X, mobile device 108 again attempts to associate with APD 114 over channel X. However, as discussed above, at this point in time APD 114 is communicating over channel Y. Therefore, mobile device 108 cannot discover APD 114 on channel X. Since APD 114 is not discoverable, mobile device 108 will eventually scan all channels of wireless network 128. Eventually, mobile device 108 may discover APD 114 on channel Y after scanning all the channels. Once discovered, mobile device 108 may then associate with APD 114 using previously used credentials.

What is needed is a system and method for a mobile client device to re-associate with an APD without having to scan all the channels of the wireless network to discover the APD.

A system and method in accordance with the present disclosure enables a mobile client device to re-associate with an APD without having to scan all the channels of the wireless network to discover the APD.

In accordance with the present disclosure an HNC will obtain mobile client device information, e.g., a wireless number, an email, etc., of a mobile client device that is associated with an APD on a first channel, say a channel X, of the wireless network.

Let the mobile client device disassociate from the APD and leave the network. Further, let the APD stops communicating on channel X and starts communicating on a second channel, say a channel Y, of the wireless network while the mobile client device is away from the network. In this situation, the HNC may send a channel information signal to the mobile client device while the mobile client device is away from the wireless network.

The HNC may send the channel information signal to the mobile client device by way of the Internet, e.g., via email, or by way of a cellular network, e.g., via a text message. The channel information signal will instruct the mobile client device as to on what channel the APD is currently communicating. By receiving the channel information signal, the mobile client device will know to discover the APD on the channel indicated in the channel information signal when the APD returns to join the wireless network. In this way, when returning to join the wireless network, the mobile client device will not have to scan all the channels of the wireless network to discover the APD. On the contrary, the mobile client device may immediately attempt to re-associate with the APD using the channel on which the APD is communicating. This will reduce the amount of time required for the mobile client device to rejoin the wireless network.

An example system and method for [inventive feature] in accordance with aspects of the present disclosure will now be described in greater detail with reference to FIGS. 2A-4.

Figure 2:
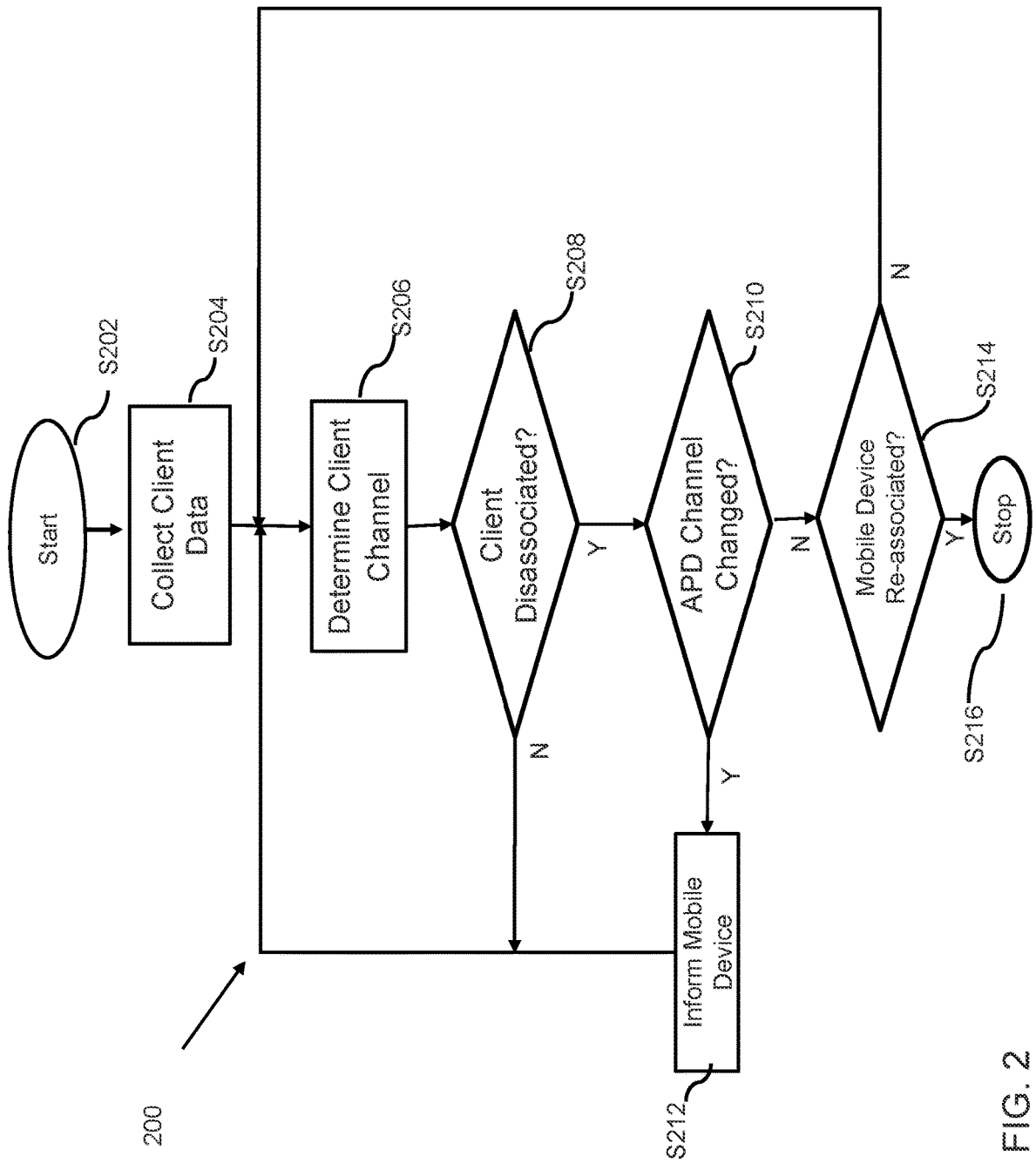
FIG. 2 illustrates an example algorithm to be executed by a processor for re-associating a client device in accordance with aspects of the disclosure.

FIG. 2 illustrates an example algorithm 200 to be executed by a processor for re-associating a client device in accordance with aspects of the disclosure.

As shown in the figure, algorithm 200 starts (S202), and client data is gathered (S204). This will be described in further detail with additional reference to FIGS. 3A and 4.

Figure 3A:
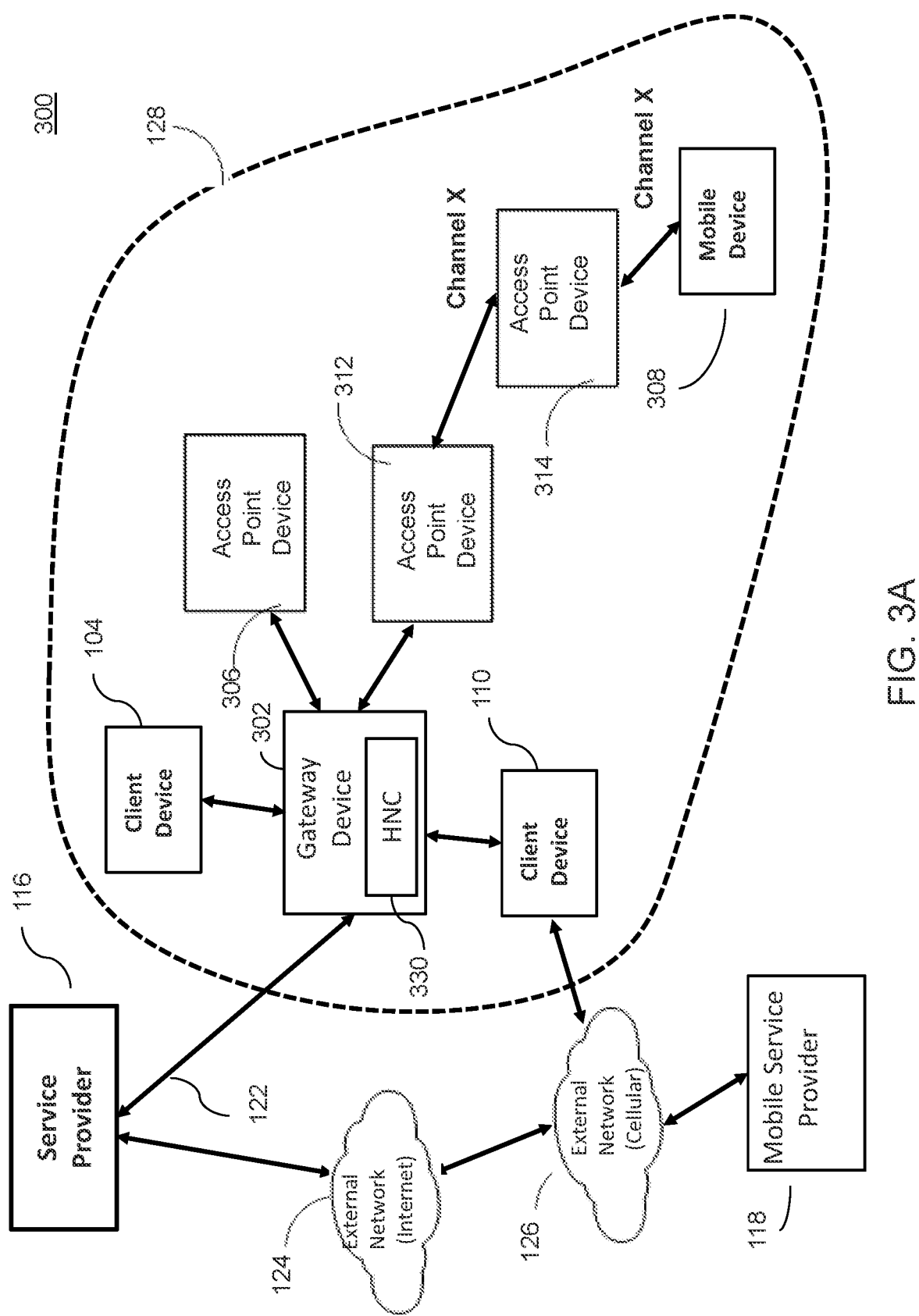
FIG. 3A illustrates a system for wireless communication at time $t_3$ in accordance with aspects of the present disclosure.

FIG. 3A illustrates a system 300 for wireless communication at time $t_3$ in accordance with aspects of the present disclosure.

As shown in the figure, system 300 includes: a gateway device 302 having a home network controller (HNC) 330 therein and providing wireless network 128; client device 104; client device 110; an APD 306; and APD 312; an APD 314; a mobile device 308; service provider 116; mobile service provider 118; external network 124, e.g., the Internet; and wireless cellular, external network 126.

Gateway device 302, also referred to as a gateway, residential gateway, or RG, is an electronic device that is to be located so as to establish a local area network (LAN) at a consumer premises. The consumer premises can include a residential dwelling or business of a user. The terms home and premises may be used synonymously herein.

Gateway device 302 may be any device or system that is configured to allow data to communicate over discrete network to another, which in this example is from service provider 116 in figure to external network 124, e.g., the Internet. Gateway device 302 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 302 establishes, or is part of, WLAN 128, using Wi-Fi for example, such that client devices 104 and 110 and mobile device 308 and APDs 306, 312 and, 314 sync and communicate wirelessly with gateway device 302. In particular, gateway device 302 is able to communicate wirelessly with client devices 104, 106, and 110 and APD 312. Further, gateway device 302 is able to communicate wirelessly with APD 314 via APD 312 and is able to communicate wirelessly with mobile device 308 via APD 312 and APD 314. The term Wi-Fi as used herein may be considered to refer to any of Wi-Fi 4, 5, 6, 6E, or any variation thereof.

Further, it should be noted that gateway device 302 is able to communicate with service provider 116 via physical media/wiring 122, and further is able to connect to external network 124, e.g., the Internet, via service provider 116.

Service provider 116 includes head-end equipment such as server computers (e.g., automatic configuration server ACS) that enable a service provider, such as a cable television provider, a satellite television provider, an internet service provider, or multiple-systems operator (MSO), to provide content (such as audio/video content and/or internet service) either through physical media/wiring 122, such as a coaxial network, an optical fiber network, and/or DSL, or wireless network 124, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a public switched telephone network (PTSA), a global Telex network, or a 2G, 3G, 4G or 5G network accessible via physical media/wiring 122. Such networks can also generally contextually be referred to herein as the internet or the cloud.

Service provider 116 includes head-end equipment such as server computers (e.g., automatic configuration server ACS) that enable a service provider, such as a cable television provider, a satellite television provider, an internet service provider, or multiple-systems operator (MSO), to provide content (such as audio/video content and/or internet service) either through physical media/wiring 122, such as a coaxial network, an optical fiber network, and/or DSL, or wireless network 124, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a public switched telephone network (PTSA), a global Telex network, or a 2G, 3G, 4G or 5G network accessible via physical media/wiring 122. Such networks can also generally contextually be referred to herein as the internet or the cloud.

Gateway device 302 serves as a gateway or access point to external network 124, e.g., the Internet (or otherwise as mentioned above), for one or more electronic devices, referred to generally herein as client devices 104 and 110, and mobile device 308 that wirelessly communicate with gateway device 302 via, e.g., Wi-Fi. Client devices 104, and 110, and mobile device 308 can be desk top computers (not mobile device 308), laptop computers, electronic tablet devices, smart phones, appliances, or any other so called internet of things equipped devices that are equipped to communicate information via WLAN 128.

APDs 306, 312, and 314 can be paired with in order to communicate wirelessly with gateway device 302 and extend the coverage area of WLAN 128. Any of the client devices or mobile devices can be in communication with gateway device 302 or any of APDs 306, 312 and 314. Client device 110 and mobile device 308 can also have a wireless data communication via wireless network 126 e.g., 3G, LTE, 4G, 5G, etc., with a mobile data provider 118.

Gateway device 302 has the capability of wirelessly communicating with plural electronic user devices over respective communication avenues. In order to extend the area in which WLAN 128 is effective, beyond the radio reach of gateway device 302, one of APDs 306, 312, and 314 can be added. The establishment of the operative communications between APD 306 and gateway device 302, between APD 312 and gateway device 302 (or between APD 314 and an already established APD 312) is referred to as onboarding the extender. APDs 306, 312, and 314 can communicate wirelessly with gateway device 302. However, rather than using one of the communication avenues that are allocated for communication with user devices, a dedicated avenue of communication may be established, at least at sometimes, between the extender and gateway device 302. This dedicated avenue is referred to as a backhaul.

Within WLAN 128, electronic devices are often referred to as being stations in WLAN 128. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just APD (APD), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. Gateway device 302, APD 312 and APD 314 are access points for WLAN 128.

Gateway device 302 gathers data on client devices. For purposes of discussion, consider mobile device 308 as a client device. In such a case, gateway device gathers data on mobile device 308. This will be described in greater detail with reference to FIG. 4.

Figure 4:
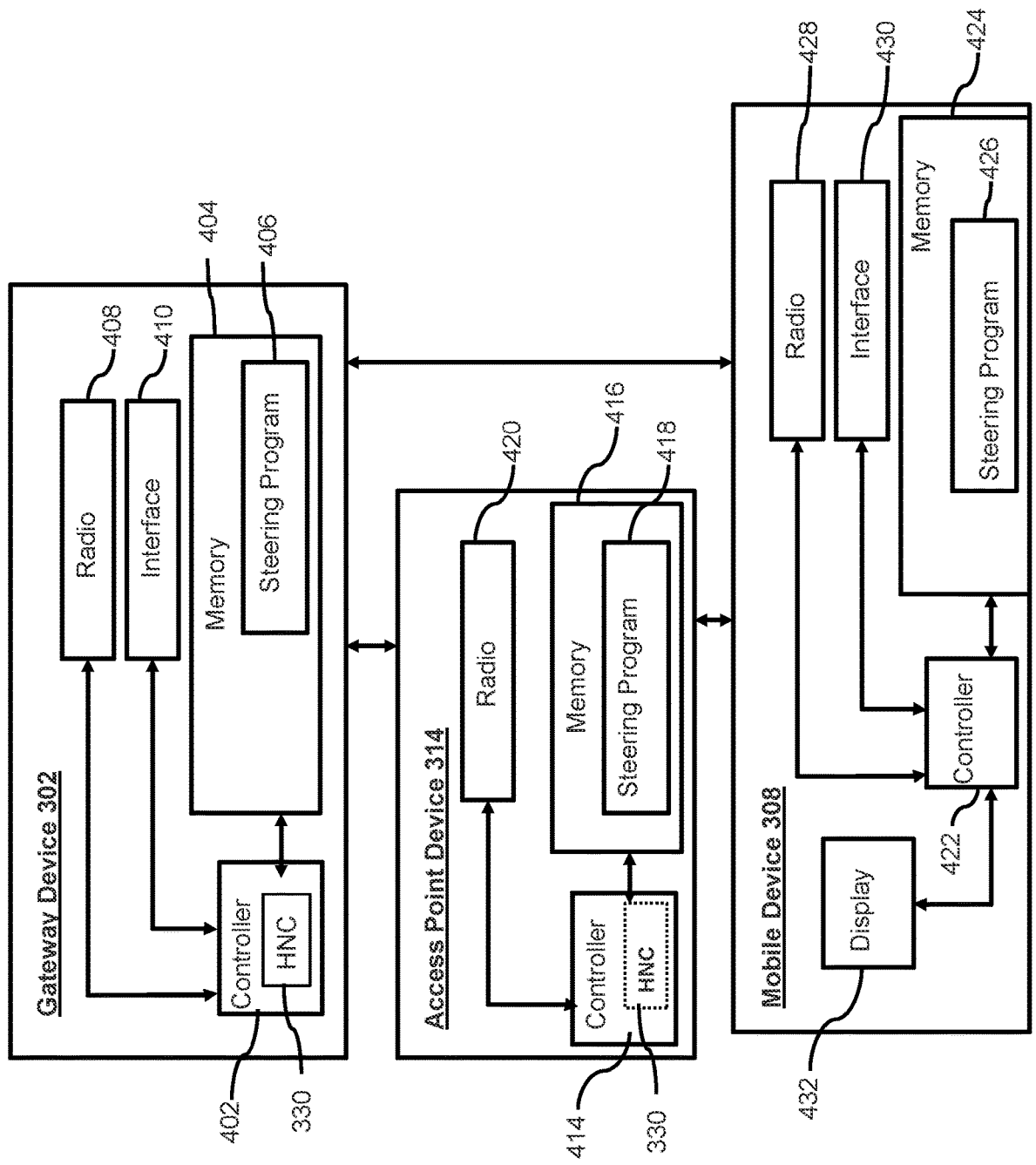
FIG. 4 illustrates an exploded view of the gateway device, an APD, and a mobile device of FIG. 3A.

FIG. 4 illustrates an exploded view of gateway device 302, APD 314, and mobile device 308.

As shown in FIG. 4, gateway device 302 includes: a controller 402 having HNC 330 disposed therein; a memory 404, which has stored therein a steering program 406; at least one radio, a sample of which is illustrated as a radio 408; and an interface circuit 410.

In this example, controller 402, memory 404, radio 408, and interface circuit 410 are illustrated as individual devices. However, in some embodiments, at least two of controller 402, memory 404, radio 408, and interface circuit 410 may be combined as a unitary device. Whether as individual devices or as combined devices, controller 402, memory 404, radio 408, and interface circuit 410 may be implemented as any combination of an apparatus, a system, and an integrated circuit. Further, in some embodiments, at least one of controller 402, memory 404 and interface circuit 410 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 can include a dedicated control circuit, CPU, microprocessor, etc. Controller 402 controls the circuits of gateway device 302.

Within gateway device 302 resides a home network controller (HNC) 330 that manages APDs within wireless network 128 (as shown for example in FIG. 3A) for example by bandwidth usage policing, dynamic load balancing, and routing. It should be noted that an HNC may reside in any access point of wireless network 128, including any of gateway device 302, and APDs 306, 312, and 314. HNC 330 is shown as a dotted box in controller 414 of APD 314 to illustrate this option arrangement. However, HNC 330 is shown here in gateway device 330 as an example and merely for purposes of discussion.

Memory 404 can store various programming, and user content, and data, including steering program 406. In some embodiments, as will be described in more detail below, steering program 406 includes instructions to be executed by HNC 330 to enable HNC 330 to: instruct APD 314 to communicate with mobile device 308 over a first channel; receive a client information signal from APD 314, the client information signal relating to mobile device 308 and including client disassociation data and client identification data; to instruct APD 314 to communicate with the mobile device 308 over the second channel; and to transmit a channel information signal to mobile device 308 via external network 124, the channel information signal includes channel identification data identifying the second channel; wherein, the client disassociation data indicates that mobile device 308 has disassociated from APD 314, and the client identification data enables HNC to transmit the channel information signal to mobile device 308 via external network 124.

In some embodiments, as will be described in more detail below, steering program 406 includes instructions to be executed by HNC 330 to enable HNC 330 to transmit the channel information signal as one of the groups consisting of an email, a text, and combinations thereof.

Interface circuit 410 can include one or more connectors, such as RF connectors, or Ethernet connectors, and/or wireless communication circuitry, such as 5G circuitry and one or more antennas. Radio 420 receives content from service provider 116 (as shown in FIG. 4) by known methods, non-limiting examples of which include terrestrial antenna, satellite dish, wired cable, DSL, optical fibers, or 5G as discussed above. Through interface circuit 410, gateway device 302 receives an input signal, including data and/or audio/video content, from service provider 116 and can send data to service provider 116.

Radio 408, (and preferably two or more radios), may also be referred to as a wireless communication circuit, such as a Wi-Fi WLAN interface radio transceiver and is configured to communicate with client devices 104, 106 and 108, with mobile device 110 and with APDs 306, 312, and 314. Radio 408 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Gateway device 302 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency For Consumer Electronics (RF4CE) protocol, Zigbee protocol, and/or IEEE 802.15.4 protocol, which also communicates in the ISM band.

APD 314 includes: a controller 414; a memory 416, which has stored therein a steering program 418; and at least one radio, a sample of which is illustrated as a radio 420. It should be noted that additional APDs including APD 306 and 312, have similar structure and operation to that of APD 314.

In this example, controller 414, memory 416 and radio 420 are illustrated as individual devices. However, in some embodiments, at least two of controller 402, memory 416 and radio 420 may be combined as a unitary device. Further, in some embodiments, at least one of controller 402 and memory 416 may be implemented as a computer having tangible computer-readable media for carrying or having computer-executable instructions or data structures stored thereon.

Controller 414, which can include a dedicated control circuit, CPU, microprocessor, etc., controls the circuits of APD 314.

Memory 416 can store various programming, and user content, and data including steering program 418. In some embodiments, as will be described in more detail below, steering program 418 includes instructions to be executed by controller 414 to enable APD 314: to forward a request for client information from gateway device 302 to mobile device 308; to forward a client information signal from mobile device 308 to gateway device 302; to perform communications on one channel; to perform communications on another channel; and to enable mobile device 308 to associate with APD 314.

Radio 420, such as a Wi-Fi WLAN interface radio transceiver, is configured to communicate with client devices 104, and 110, with mobile device 308 and with gateway device 302, as shown in FIG. 3A. Radio 420 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. APD 314 can also be equipped with a radio to implement a Bluetooth interface radio transceiver and antenna, which communicates wirelessly in the ISM band, from 2.400 to 2.485 GHz. As an alternative, at least one of the radios can be a radio meeting a RF4C protocol, Zigbee protocol, and/or IEEE802.15.4 protocol, which also communicates in the ISM band.

Mobile device 308 includes: a controller 422; a memory 424, which has stored therein a steering program 426; and at least one radio, a sample of which is illustrated as a radio 428; an interface circuit 430 and a display 432.

In this example, controller 422, memory 424, radio 428, interface circuit 430 and display 432 are illustrated as individual devices. However, in some embodiments, at least two of controller 422, memory 424, radio 428, interface circuit 430 and display 432 may be combined as a unitary device. Further, in some embodiments, at least one of controller 422 and memory 424 may be implemented as a computer having tangible computer-readable media for carrying or having computer-executable instructions or data structures stored thereon.

Controller 422, which can include a dedicated control circuit, CPU, microprocessor, etc., controls the circuits of mobile device 110.

Memory 424 can store various programming, and user content, and data including steering program 426. In some embodiments, as will be described in more detail below, steering program 426 includes instructions to be executed by controller 422 to enable mobile device 308 to: receive a request for client information from APD 314; to transmit a client information signal to APD 314; to associate with APD 314, to disassociate from APD 314; and to receive a channel information signal from gateway device 302 via external network 124, cellular network 126 or a combination thereof.

Radio 428, may include a Wi-Fi WLAN interface radio transceiver that is configured to communicate with client devices 104, 106 and 108, with APDs 306, 312, and 314, and with gateway device 302, as shown in FIG. 3A and also may include a cellular transceiver configured to communicate with mobile data provider 118 through wireless network 126. Radio 420 includes one or more antennas and communicates wirelessly via one or more of the 2.4 GHz band, the 5 GHz band, and the 6 GHz band, or at the appropriate band and bandwidth to implement the Wi-Fi 4, 5, 6, or 6E protocols. Mobile device 308 can also be equipped with a radio to implement a Bluetooth interface radio transceiver and antenna, which communicates wirelessly in the ISM band, from 2.400 to 2.485 GHz. As an alternative, at least one of the radios can be a radio meeting a RF4CE protocol, Zigbee protocol, and/or IEEE802.15.4 protocol, which also communicates in the ISM band.

Any of the client devices within WLAN 128 may be a mobile device similar to mobile device 308. In the event that a client device within WLAN 128 is not a mobile device similar to mobile device 308, such a client device may still include: a controller, which can include a dedicated control circuit, CPU, microprocessor, etc., and that controls the circuits of the client device; a memory, which has stored therein an onboarding program, that is similar to memory 424 and steering program 426, respectively, of mobile device 110 discussed above; a radio similar to radio 428 of mobile device 308 discussed above; in additional to further functional circuitry. Accordingly, any of the client devices may include a Wi-Fi WLAN interface radio transceiver, that is configured to communicate with other client devices, with APDs 306, 312, and 314 and with gateway device 302, as shown in FIG. 3A and also may include a cellular transceiver configured to communicate with mobile data provider 118 through wireless network 126. Further, any of the client devices may include a radio that is similar to radio 420 of mobile device 308 discussed above. Still further, any of the client devices may be equipped with a radio to implement a Bluetooth interface radio transceiver and antenna, or with a radio meeting RF4CE protocol, Zigbee protocol, and/or IEEE 802.15.4 protocol, which also communicates in the ISM band, in a manner similar to mobile device 308 discussed above.

In some embodiments, gateway device 302 may gather mobile device contact information from mobile device 308 by way of a request. For example, based on instructions from steering program 406, HNC 330 may instruct radio 408 to transmit a request for client information to mobile device 308 via APD 314. In particular, radio 408 may transmit the request for client information to APD 314, which will be received by radio 420. Based on instructions within steering program 418, controller 414 will instruct radio 420 to forward the request for client information to mobile device 308, which will be received by radio 428. Based on instructions within steering program 426, controller 422 will retrieve contact information from memory 424. Non-limiting examples of contact information include a telephone number of mobile device 308, an email account associated with the user of mobile device 308, and combinations thereof. Controller 422 will then generate a client information signal based on the contact information from memory 424.

Controller 422 will then instruct radio 428 to transmit the client information signal to gateway device 302 via APD 314. In particular, radio 428 may transmit the client information signal to APD 314, which will be received by radio 420. Based on instructions within steering program 418, controller 414 will instruct radio 420 to forward the client information signal to gateway device 302, which will be received by radio 408. Based on instructions within steering program 406, HNC 330 will retrieve contact information from the client information signal and store the contact information into memory 404.

In some embodiments, gateway device 302 may gather mobile device contact information from mobile device 308 by way of transmission form mobile 308 absent a request. For example, in the event that mobile device 308 is about to disassociate from APD 314, i.e., leave network 128, controller 422 will then generate a client information signal based on the contact information from memory 424 and based on client disassociation data indicating that mobile device 308 is disassociating from APD 314.

Controller 422 will then instruct radio 428 to transmit the client information signal to gateway device 302 via APD 314. In particular, radio 428 may transmit the client information signal to APD 314, which will be received by radio 420. Based on instructions within steering program 418, controller 414 will instruct radio 420 to forward the client information signal to gateway device 302, which will be received by radio 408. Based on instructions within steering program 406, HNC 330 will retrieve contact information from the client information signal and store the contact information into memory 404 and know that mobile device 308 is about to disassociate from APD 314.

Returning to FIG. 2 after client data is gathered (S204), client channel is determined (S206). For example, HNC 330 may determine on what channel APD 314 is currently communicating. As shown in FIG. 3A, APD 314 is currently communicating on channel X.

Returning to FIG. 2, after a client channel is determined (S206), it is determined whether a client is disassociated (S208). For example, as shown in FIG. 3A, HNC 330 constantly monitors and communicates with all APDs within wireless network 128 to obtain resource information, which includes what client devices are associated with which APDs. As soon as a client device associates with any of APDs 306, 312, or 314, the respective APD will inform HNC 330. Similarly, as soon as a client device disassociates with any of APDs 306, 312, or 314, the respective APD will inform HNC 330.

Figure 3B:
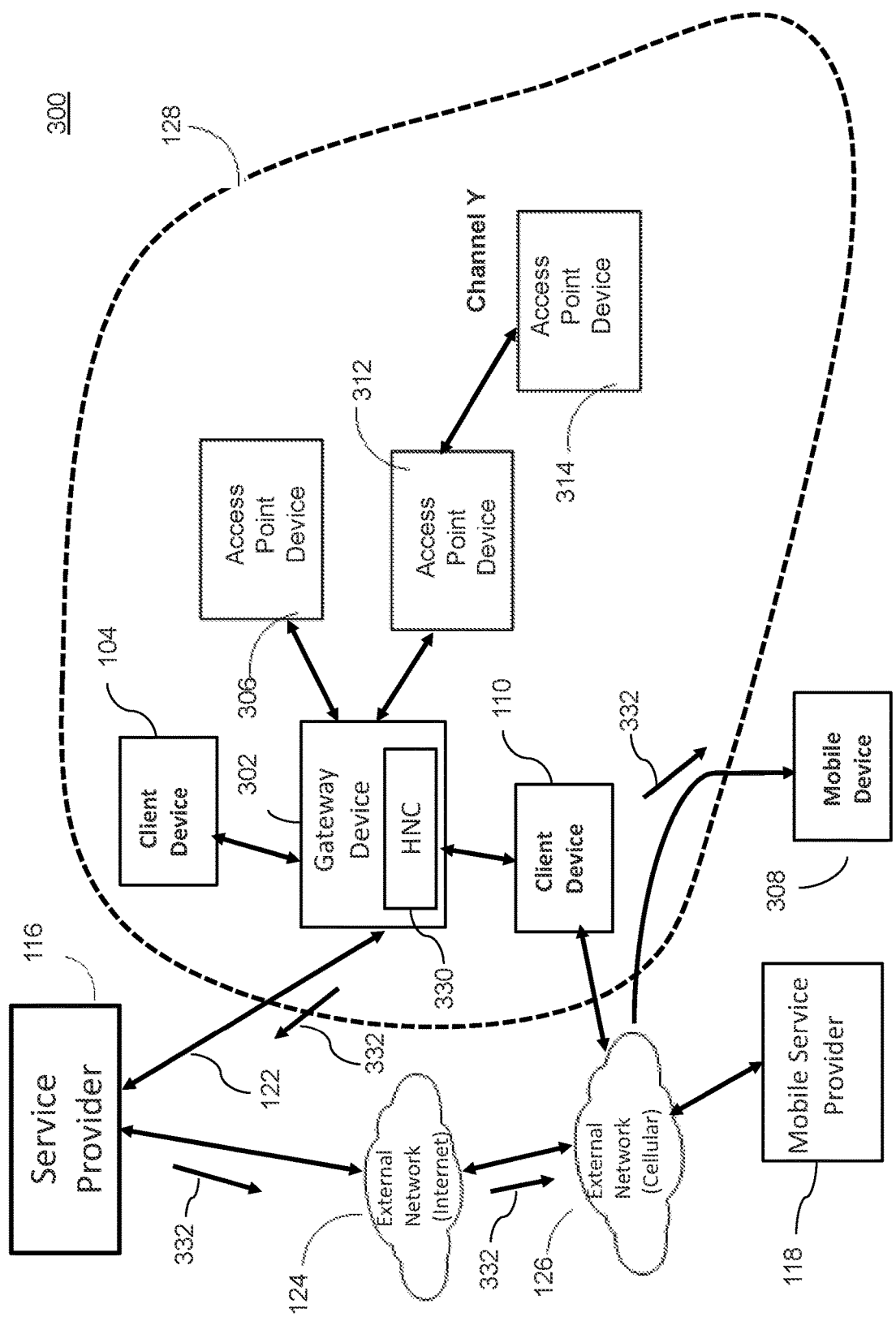
FIG. 3B illustrates the system of FIG. 3A at time $t_4$.

Returning to FIG. 2, if it is determined that a client has not disassociated (No at S208), then a client channel is again determined (return to S206). In this way, HNC constantly updates that channel that each APD is respectively communicating. However, if it is determined that a client has disassociated (Yes at S208), then it is determined whether APD channel has changed (S210). For example, as shown in FIG. 3A, HNC 330 may instruct any of the APDs to switch communication from one channel to another in order to optimize network resources. In the figure, at time $t_3$, APD 314 is communicating on channel X. However, FIG. 3B illustrates system 300 at time $t_4$, wherein APD 314 is communicating on channel Y.

Returning to FIG. 2, if it is determined that the APD channel has changed (Yes at S210), then the mobile device is informed (S212). This will be described with additional reference to FIG. 3B.

As shown in the figure, at time $t_4$, mobile device 308 has disassociated from APD 314 and left wireless network 128. Further, at time $t_4$, APD 314 is currently communicating on channel Y. As discussed above, HNC 330 has learned of the disassociation of mobile device 308 from APD 314, has learned that APD 314 is currently communicating on channel Y, and has learned the contact information of mobile device 308 from the client identification data. Accordingly, HNC will transmit a channel information signal 332 to mobile device 308 via external network 126, wherein channel information signal 332 includes channel identification data identifying the second channel. In this example embodiment, channel information signal 332 includes channel identification data identifying channel Y as the channel that APD 314 is currently communicating.

With the channel identification data, mobile device 308 will be able to quickly discover APD 314 by communicating on channel Y, so as to re-associate with APD 314 when mobile device 308 returns to connect with wireless network 128.

Returning to FIG. 2, after the mobile device is informed (S212), then the client channel is again determined (return to S206). In this manner, HNC may constantly update the channel for which APD 314 is communicating in the event that APD 314 switches to a different channel before mobile device 308 returns to join wireless network 128.

If it is determined that the APD channel has not changed (No at S210), then it is determined whether the mobile device has re-associated with the APD (S214). For example, returning to FIG. 3A, if APD 314 has not changed the channel for which it was communicating, which in this example is channel X, then as indicated above, HNC constantly receives updates as to the client devices being associated with the APDs.

Returning to FIG. 2, if it is determined that the mobile device has not re-associated with the APD (No at S214), then the client channel is again determined (return to S206). However, if it is determined that the mobile device has re-associated with the APD (Yes at S214), then algorithm 200 stops (S216).

Figure 3C:
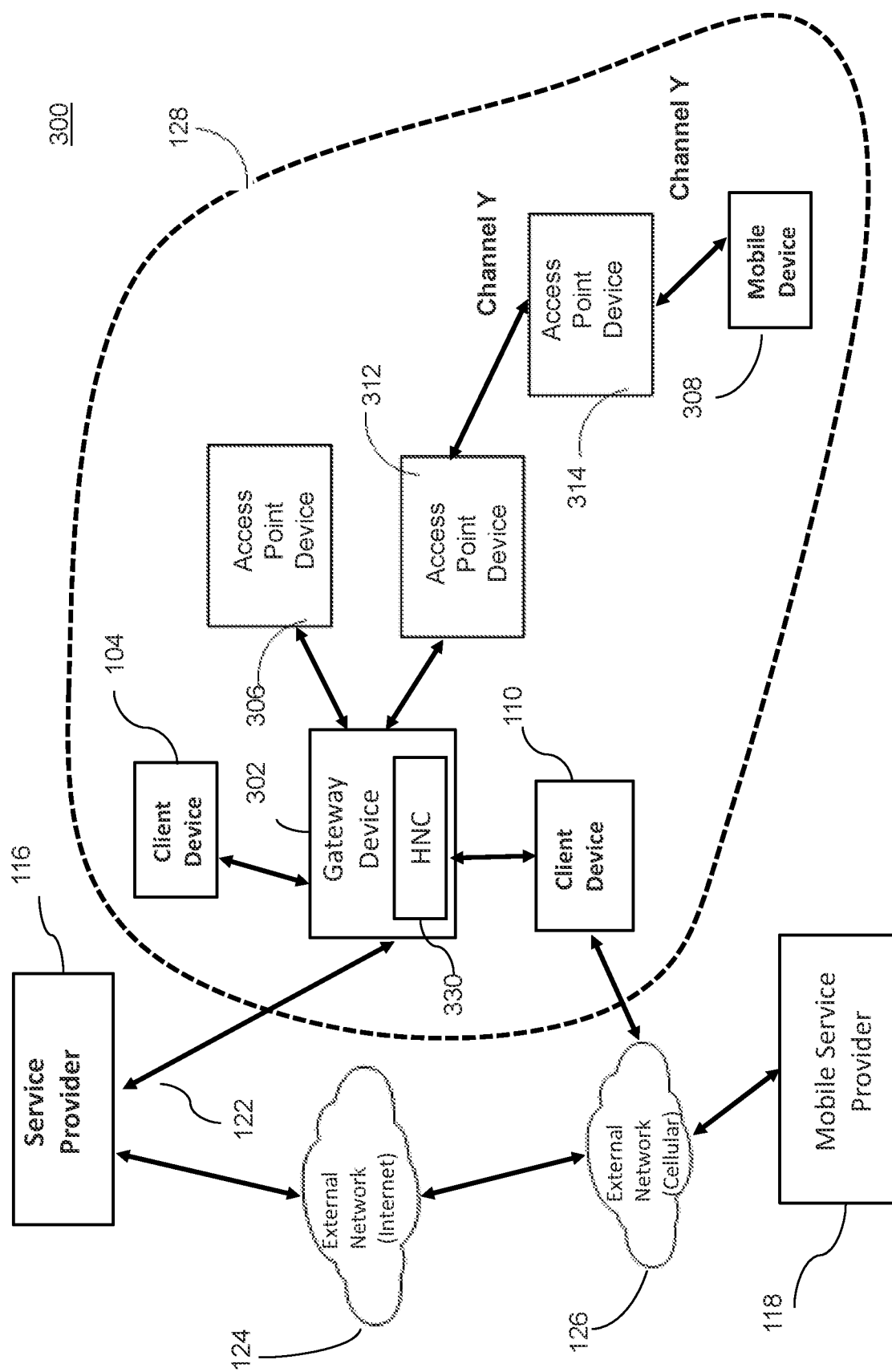
FIG. 3C illustrates the system of FIG. 3A at time $t_5$.

FIG. 3C illustrates system 300 at time $t_5$. As shown in the figure, mobile device 308 has re-associated with APD 314. Using the channel identification data identifying channel Y from channel information signal 332, mobile device 308 was able to quickly discover APD 314 on channel Y without having to scan all the channels on wireless network 128. In this manner, mobile device 308 was able to quickly re-associate with APD 314.

The processes disclosed above constitute algorithms that can be affected by software, applications (apps, or mobile apps), or computer programs. The software, applications, computer programs can be stored on a non-transitory computer-readable medium for causing a computer, such as the one or more processors, to execute the processes described herein and shown in the drawing figures.

In a conventional system, if a client device disassociates from an APD and then later returns to rejoin the wireless network, the mobile client device would need to scan all the channels of the wireless network to discover the APD in order to re-associate. This scanning of all the channels increases the time for the client device to re-associate with the APD.

In accordance with the present disclosure, the HNC may send the channel information signal to the mobile client device by way of the Internet, e.g., via email, or by way of a cellular network, e.g., via a text message. The channel information signal will instruct the mobile client device as to on what channel the APD is currently communicating. By receiving the channel information signal, the mobile client device will know to discover the APD on the channel indicated in the channel information signal when the APD returns to join the wireless network. In this way, when returning to join the wireless network, the mobile client device will not have to scan all the channels of the wireless network to discover the APD. On the contrary, the mobile client device may immediately attempt to re-associate with the APD using the channel on which the APD is communicating. This will reduce the amount of time required for the mobile client device to rejoin the wireless network.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A home network controller device for use with an access point device and a wireless client device over a wireless local area network and configured to communicate with an external network, the access point device is configured to communicate with the external network over a first channel within the wireless local area network and over a second channel within the wireless local area network, the access point device is configured to transmit a client information signal via the wireless local area network, said home network controller device include:
    a memory;
    a processor configured to execute instructions stored on said memory to cause said home network controller device to:
        instruct the access point device to communicate with the wireless client device over the first channel;
        receive a client information signal from the access point device, the client information signal relating to the wireless client device and including client disassociation data and client identification data;
        instruct the access point device to communicate with the wireless client device over the second channel; and
        transmit a channel information signal to the wireless client device via the external network, the channel information signal includes channel identification data identifying the second channel;
    wherein, the client disassociation data indicates that the wireless client device has disassociated from the access point device, and the client identification data enables said processor to transmit the channel information signal to the wireless client device via the external network.

2. The home network controller device of claim 1, wherein said processor is further configured cause the home network controller to transmit the channel information signal as one of the group consisting of an email, a text, and combination thereof.

3. The home network controller device of claim 1, wherein said memory and said processor are disposed within a gateway device.

4. The home network controller device of claim 1, wherein said memory and said processor are disposed within a second access point device.

5. A method of operating a home network controller device for use with an access point device and a wireless client device over a wireless local area network and configured to communicate with an external network, the access point device is configured to communicate with the external network over a first channel within the wireless local area network and over a second channel within the wireless local area network, the access point device is configured to transmit a client information signal via the wireless local area network, said method include:
- instructing, via a processor configured to execute instructions stored on a memory, the access point device to communicate with the wireless client device over the first channel;
- receiving, via the processor, a client information signal from the access point device, the client information signal relating to the wireless client device and including client disassociation data and client identification data;
- instructing, via the processor, the access point device to communicate with the wireless client device over the second channel; and
- transmitting, via the processor, a channel information signal to the wireless client device via the external network, the channel information signal including channel identification data identifying the second channel,
- wherein, the client disassociation data indicates that the wireless client device has disassociated from the access point device, and the client identification data enables said processor to transmit the channel information signal to the wireless client device via the external network.

6. The method of claim 5, wherein said transmitting the channel information signal to the wireless client device comprises transmitting the channel information signal as one of the group consisting of an email, a text, and combinations thereof.

7. A non-transitory, computer-readable media having computer-readable instructions stored thereon, the computer-readable instructions is capable of being read by a home network controller device for use with an access point device and a wireless client device over a wireless local area network and configured to communicate with an external network, the access point device is configured to communicate with the external network over a first channel within the wireless local area network and over a second channel within the local area network, the access point device is configured to transmit a client information signal via the wireless local area network, wherein the computer-readable instructions are capable of instructing the home network controller device to perform the method include:
- instructing, via a processor configured to execute instructions stored on a memory, the access point device to communicate with the wireless client device over the first channel;
- receiving, via the processor, a client information signal from the access point device, the client information signal relating to the wireless client device and including client disassociation data and client identification data;
- instructing, via the processor, the access point device to communicate with the wireless client device over the second channel; and
- transmitting, via the processor, a channel information signal to the wireless client device via the external network, the channel information signal including channel identification data identifying the second channel,
- wherein, the client disassociation data indicates that the wireless client device has disassociated from the access point device, and the client identification data enables said processor to transmit the channel information signal to the wireless client device via the external network.

8. The non-transitory, computer-readable media of claim 7, wherein the computer-readable instructions are capable of instructing the home network controller device to perform the method wherein said transmitting the channel information signal to the wireless client device comprises transmitting the channel information signal as one of the group consisting of an email, a text and combinations thereof.

* * * * *